Sept. 17, 1968   B. F. SEAMAN ET AL   3,402,082
METHOD AND APPARATUS FOR PATTERN REGISTRATION
Filed Jan. 22, 1965

INVENTORS.
BURCH FENNER SEAMAN
FRED ALLEN YODER
BY
James T. Dunn
ATTORNEY

United States Patent Office 3,402,082
Patented Sept. 17, 1968

3,402,082
METHOD AND APPARATUS FOR
PATTERN REGISTRATION
Burch Fenner Seaman, Springfield, and Fred Allen Yoder, Middletown, Ohio, assignors to Formica Corporation, Cincinnati, Ohio, a corporation of Ohio
Filed Jan. 22, 1965, Ser. No. 427,219
2 Claims. (Cl. 156—10)

ABSTRACT OF THE DISCLOSURE

Method and apparatus are disclosed for cutting and making a continuous pattern upon a gravure cylinder. A photoresist emulsion printed carbon tissue is placed around a pair of spaced parallel rollers with the emulsion side in contact with the rollers wherein the ends of said tissue are brought into overlapping contact with proper registration over an anvil plate including a scratch resistant cutting surface. A clamp bar with a cutting slot is positioned over the overlapping contact and the tissue is properly cut through said slot to form the desired pattern. The tissue is removed from said plate and positioned upon a gravure cylinder with its emulsion surface in contact therewith wherein the cylinder is flooded with a liquid while squeegeeing the tissue thereon. Subsequently, the tissue is soaked and removed from the cylinder leaving the emulsion thereon where said emulsion is dryed and the cylinder is masked and etched.

---

Figure 2:
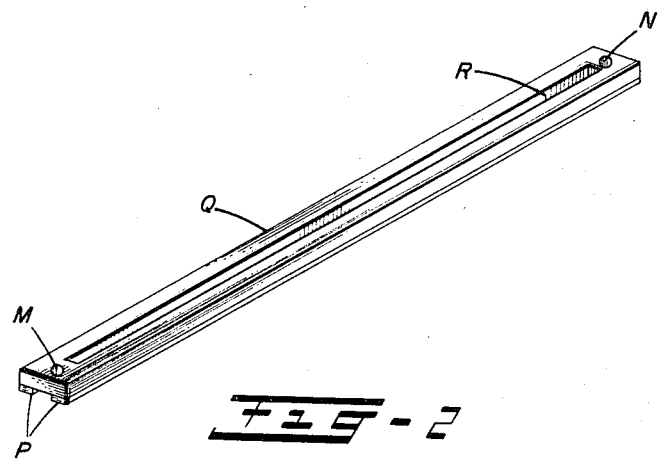

This invention relates to an apparatus for cutting printed carbon tissue so as to carry a design in register. Still further, this invention relates to a process for making a join of a continuous pattern on a gravure cylinder by use of the apparatus of the present invention.

One of the objects of the present invention is to produce a piece of apparatus to be used for cutting printed carbon tissue so as to carry a design in register and exact measurement. A still further object of the present invention is to provide a process for making a join of a continuous pattern on a gravure cylinder by use of the apparatus of the present invention. A still further object of the present invention is to provide a piece of apparatus and a process in which said apparatus is used to produce a continuous pattern printed on a paper web, which pattern is imparted to said paper web by use of a gravure cylinder, which cylinder carries a printed design having a join of the continuous pattern on the gravure cylinder which is substantially invisible to the naked eye. A still further object of the present invention is to provide a process for producing a continuous pattern on a paper web, which paper web can be used in the manufacture of decorative laminates wherein a continuous pattern such as a wood print is required wherein the joint of the pattern on the gravure cylinder is accomplished so nearly perfectly that the join is not detectable by the human eye. These and other objects of the present invention will be discussed in greater detail hereinbelow.

The decorative laminate art is highly developed and practiced commercially to produce decorative laminates which provide structures which can be used for countertops, table tops, wall siding, both interior and exterior, in order to impart thereto an aesthetic appearance while still providing a comparatively low cost but highly serviceable surface. When this industry was in its infancy, it was considered necessary whenever a wood grain was desired in a decorative laminate to utilize a thin veneer of actual wood either pine, oak, birch, mahogany or comparable beautiful wood grains. These wood veneers were produced only with great difficulty and freqeuntly displayed imperfections due to the nature of the wood from which the veneer was taken. These wood veneers were comparatively expensive and frequently had to be discarded, because of the aforementioned imperfections, resulting in a significant measure of waste. It became apparent that one solution to the problem would be to select an actual wood veneer of a particular type of wood which had for all practical purposes, a perfect or near perfect appearance, which veneer could then be photographed and the negative could be transposed onto a gelatin emulsion and transferred to a gravure cylinder.

These carbon tissues are gelatin coated papers that are used as a photoresist principally by engravers. They are manufactured and sold by a plurality of companies in the United States as well as in foreign countries. In producing the carbon tissue, the manufacturers coat the paper with a gelatin emulsion which has incorporated therein an agent for coloring. The engraver sensitizes the emulsion to light generally with a potassium bichromate solution. Thereupon the engraver dries the sensitized emulsion and exposes it to light through the proper screens and positives. In subsequent steps the carbon tissue is transferred emulsion side to a polished copper printing roller. A solvent (usually water) is used to soak the paper from the gelatin emulsion leaving the emulsion adhering to the copper surface. After it is dried, the emulsion fulfills its function as an acid resist. The resistance of the emulsion to acid penetration is in direct proportion to the thicknes of the emulsion. In turn, the thickness is in proportion to the exposure to light. Conventional acidic materials such as ferric chloride would be used to treat the emulsion on the copper printing roller so as to impart the desired design thereto. Other kinds of photoresists may also be used such as the film supported gelatins which use conventional silver salts as light sensitizers. The carbon tissue must be handled with significant care in order to reduce to a minimum the exposure of the emulsion to contact with the operator's hands. Therefore, it is necessary that the carbon tissue be prepared in the cutting device of the present invention in a manner that will permit its handling without touching the emulsion.

Figure 1:
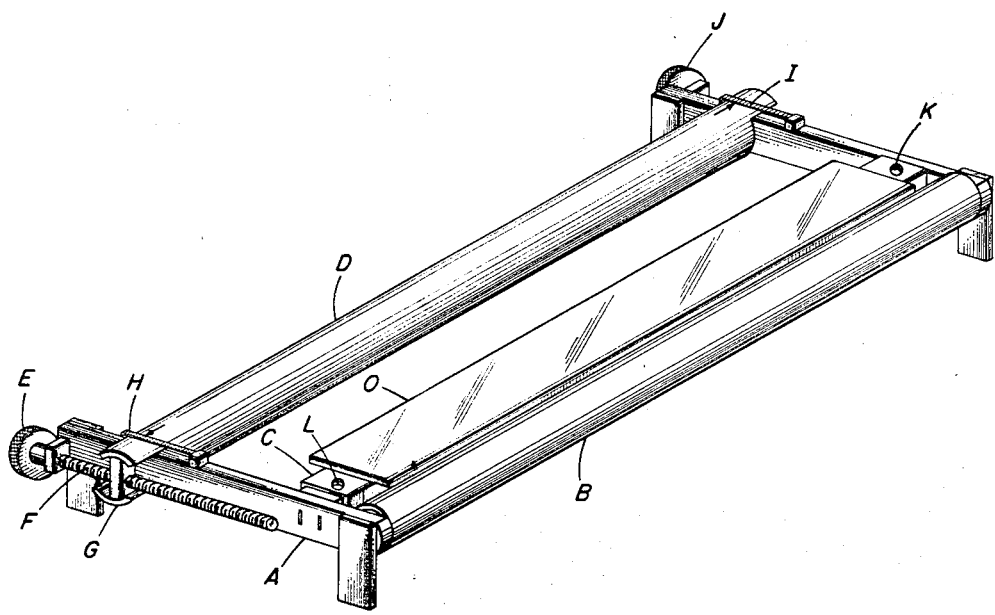

The apparatus of the present invention and the process of the present invention in which the apparatus is used will be more readily understood by reference to the accompanying drawings in which FIG. 1 shows the device of the present invention with the clamp bar missing. FIG. 2 shows the clamp bar and each figure is an isometric representation of the apparatus. When the clamp bar of FIG. 2 is superimposed on the anvil plate in its operative position, the total apparatus is complete.

In FIG. 1 the frame A supports the aluminum tube B and D which are spaced in parallel relationship and the tube D is laterally adjustable to and from the tube B by utilizing the handwheel E which engages the threaded rod F through a compatible threaded hole in the yoke G whereby the lower end of the tube D will move, thereby changing the distance between the aluminum tubes B and D until the entire periphery around the tubes B and D corresponds precisely to the premeasured circumference of the polished copper printing roller. Corresponding to the handwheel E is the handwheel J which permits the adjustment of the position of the upper end of the tube D. The indicating scales H and I permit a micrometer type measurement of the position of the tubing D at each of its extremities. The anvil plate O is a hard, scratch-resistant, flat, smooth object preferably made of plate glass. At each end of the anvil plate there is positioned the holes K and L drilled into the steel anvil C. In FIG. 2 is shown the clamp bar Q at each extremity in which is positioned the holes M and N through which knurled head clamp bolts (not shown) are inserted so as to engage with the threaded holes L and K when the clamp bar Q is placed in an operating position above the anvil plate O. In the clamp bar Q there is located the long lateral slot R through which a cutting instrument such as a knife can be inserted so as to cut the join of the printed carbon tissue resting in overlapping relationship on the anvil plate O. Underneath the clamp bar Q are the friction cushions P. Having thus described the apparatus per se, a description of the process for utilizing the apparatus will now be set forth.

The apparatus as shown in FIG. 1 is placed on a support. A tape measure is used to measure the periphery around the tubes B and D so as to correspond precisely with the circumference of the printing cylinder. Thereupon a printed carbon tissue is slid under the rollers B and D with the emulsion side up. That end of the carbon tissue located near the tube D is pulled up and over D as far as the anvil plate leaving approximately ½" of the anvil plate exposed. This end of the carbon tissue is held in place while the other end is pulled up and over the tube B so as to accomplish an overlap with the first end on the anvil plate. The carbon tissue is then maneuvered into the proper register. Once the tissue is taut on both sides and the scribed register marks lineup at both ends indicating perfect register, the top and i.e. that end which was brought up and around the tube B is allowed to fall back away from the anvil plate area while the other end is fastened with a pressure sensitive tape to the anvil plate. When this has been accomplished the free end is again pulled taut over the tube B and again accomplishes an overlapping of the anchored end. The register is checked again by the alignment of the scribed center lines on the tissue. When the tissue is in perfect register, the upper end of the tissue is taped or anchored to the tissue beneath it. Thereupon the clamp bar Q is placed over the tissue-covered anvil and knurled head clamp bolts are inserted in the holes M and N and into the threaded holes L and K and the clamp bar is thus fastened securely in place. A long thin knife with a narrow sharp point is used to cut through the assembly. The knife is hand-held firmly in a vertical position for the entire cut. The cut is started from one end of the cutting slot R and as the cut progresses the knife is turned gradually first to the left and then to the right in order to produce an irregular cut in the nature of a series of waves. The carbon tissue sheet is then removed from the cutting jig and is prepared for further processing in preparation for the layon operation.

Hereinabove it is stated that the periphery around the tubes B and D is premeasured very accurately in order to be exactly the same size as the circumference of the gravure cylinder. This measurement of the cylinder is accomplished by use of a steel tape. When the measurement of the cylinder circumference is precisely determined, the tape is then applied to one end of the device shown in FIGURE 1 by inserting one end of the tape under the aluminum tube B and under the rear aluminum tube D. The end of the tape is then brought up and over tube D back to the anvil plate O. The other end is brought up and over tube B to the anvil plate so as to meet the first end. The handwheel E is turned clockwise and the threaded rod F through the compatible threaded hole in the yoke G is turned clockwise so as to move the end of the tube D. This adjustment is accomplished at both ends of the tube D by comparable turning of the handwheel J until the peripheral measurement around the tubes B and D corresponds exactly to the circumference of the gravure cylinder.

When the carbon tissue paper has been cut by the knife through the opening in the clamp bar, the tissue is removed and transferred to the premeasured polished copper printing roller with the emulsion side in contact with the roller. It is necessary that the polished copper cylinder, before the application of the tissue, be in a dry state and be kept dry until the carbon tissue has been located between an impression roller and the copper cylinder and until the carbon tissue has been attached to a lugging bar for location reference. Circumferentially, the cylinder is positioned by the operator using an indexing mechanism which is part of the machine. The impression cylinder is brought down against the leader and the copper cylinder. The impression may start on the lugging bar-leader material so as not to create a dwell pressure on the carbon tissue itself. The leader material is unfastened from the lugging bar and the copper face of the cylinder is flooded with water. Caution must be exercised to prevent water from touching the gelatin emulsion before it contacts the cylinder. After flooding the cylinder with water, the cylinder is then rotated and the nip between the impression cylinder and the copper cylinder produces a squeegeeing action causing the emulsion to adhere to the copper surface. Thereafter, the backing of the tissue sheet is removed from the cylinder leaving behind the emulsion gelatin. The cylinder is then staged to protect the ends from the etching solution and final touches to correct the register are made at the join if necessary. The etching step follows.

After the etching step, the emulsion is removed from the cylinder and the gravure cylinder is then ready for use in a continuous web printing operation.

Although, copper is generally the metal used in the gravure cylinder, other metals such as aluminum can also be used.

We claim:

1. A device for cutting printed carbon tissue so as to carry a design in register comprising a support frame, a pair of parallel, spaced tubes mounted on said frame, one of said tubes being laterally adjustable to and from the other said tube, said tubes being positioned substantially parallel to one another, an anvil plate having a scratch resistant cutting surface mounted on said frame between said tubes and substantially parallel to said tubes, a clamp bar positioned above said anvil plate and also substantially parallel to said tubes and having a cutting slot running across the anvil plate.

2. A process for making a join of a continuous pattern on a gravure cylinder comprising placing a printed carbon tissue around a pair of spaced parallel rollers with the photoresist emulsion side in contact with said rollers wherein the periphery around the space around said rollers is adjusted to be substantially exactly the same as the circumference of the gravure cylinder to which the carbon tissue will be applied, bringing the ends of said tissue into an overlapping contact with one another over an anvil plate, manuevering said respective ends of said tissue into proper register, inscribing register marks at both ends of the tissue, positioning a clamp bar with a cutting slot over the overlapping contact, cutting the tissue through said slot to form the desired pattern, removing said tissue from said plate and positioning said tissue on a gravure cylinder with the emulsion side in contact with said cylinder, flooding said cylinder with water while squeegeeing said tissue onto the cylinder, soaking said tissue, removing the carbon tissue from said emulsion thereby leaving the emulsion on said cylinder, drying the emulsion, staging the cylinder and etching said cylinder through said emulsion with a mordant material.

(References on following page)

References Cited

UNITED STATES PATENTS

| | | | |
|---|---|---|---|
| 1,308,531 | 7/1919 | Saalburg | 156—10 XR |
| 1,555,105 | 9/1925 | Dausmann | 156—10 XR |
| 1,911,254 | 5/1933 | Wolfsohn | 156—10 |

FOREIGN PATENTS

| | | |
|---|---|---|
| 275,748 | 8/1927 | Great Britain. |
| 313,911 | 8/1930 | Great Britain. |

ROBERT F. BURNETT, *Primary Examiner.*

W. A. POWELL, *Assistant Examiner.*